(12) United States Patent
Farsoni et al.

(10) Patent No.: US 10,031,242 B1
(45) Date of Patent: Jul. 24, 2018

(54) LOW-COST AND LOWER-POWER RADIATION SPECTROMETER

(71) Applicant: Oregon State University, Corvallis, OR (US)

(72) Inventors: Abdollah Tavakoli Farsoni, Corvallis, OR (US); Eric Matthew Becker, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 15/541,250

(22) PCT Filed: Jan. 27, 2016

(86) PCT No.: PCT/US2016/015147
§ 371 (c)(1),
(2) Date: Jun. 30, 2017

(87) PCT Pub. No.: WO2016/123231
PCT Pub. Date: Aug. 4, 2016

Related U.S. Application Data

(60) Provisional application No. 62/108,391, filed on Jan. 27, 2015.

(51) Int. Cl.
*G01T 1/20* (2006.01)
*G01T 1/17* (2006.01)
(Continued)

(52) U.S. Cl.
CPC .............. *G01T 1/17* (2013.01); *G01T 1/023* (2013.01); *G01T 1/208* (2013.01); *G01T 1/362* (2013.01)

(58) Field of Classification Search
CPC .............. H03F 3/087; H03F 3/45475; H03F 2200/331; G01T 1/171
See application file for complete search history.

(56) References Cited

U.S. PATENT DOCUMENTS 5,285,072 A    2/1994    Klingenbeck-Regn et al.
5,309,357 A    5/1994    Stark et al.
(Continued)

FOREIGN PATENT DOCUMENTS

JP    2013-7585 A    1/2013
WO    WO 2012/110162 A1    8/2012
WO    WO 2015/167967 A1    11/2015

OTHER PUBLICATIONS

Becker et al., "Wireless, low-cost, FPGA-based miniature gamma ray spectrometer," *Nuclear Instruments and Methods in Physics Research Section A: Accelerators, Spectrometers, Detectors and Associated Equipment*, vol. 761, Oct. 2014, pp. 99-104.
(Continued)

*Primary Examiner* — Kiho Kim
(74) *Attorney, Agent, or Firm* — Klarquist Sparkman, LLP

(57) ABSTRACT

An apparatus for detecting radiation energy includes a first comparator coupled to a first voltage source applying a first threshold voltage to the first comparator. The apparatus includes a second comparator, a radiation detector, Analog-to-Digital Converter (ADC), and control circuitry. The second comparator is coupled to a second voltage source applying a second threshold voltage to the second comparator. The radiation detector is coupled to the first and second comparators. The ADC has a first input coupled to the detector, and is responsive to a second input for placing it in a low-power mode. The control circuitry is coupled to outputs of the comparators and the ADC, and the control circuitry temporarily switches the ADC from the low-power mode to a normal operating mode to perform a peak measurement of detected radiation energy, and determine the first and second threshold voltages based on the peak measurement.

20 Claims, 13 Drawing Sheets

(51) Int. Cl.
*G01T 1/36* (2006.01)
*G01T 1/02* (2006.01)
*G01T 1/208* (2006.01)

(56) References Cited

U.S. PATENT DOCUMENTS

| | | |
|---|---|---|
| 7,253,387 B2 | 8/2007 | Archer et al. |
| 9,176,240 B2 | 11/2015 | Gagnon et al. |
| 2004/0017224 A1* | 1/2004 | Tumer ............... H03F 3/087 327/51 |
| 2014/0188418 A1* | 7/2014 | Inoue ................. G01T 1/171 702/66 |

OTHER PUBLICATIONS

International Search Report and Written Opinion for PCT/US2016/015147, dated May 15, 2016, 7 pages.

* cited by examiner

LOW-COST AND LOWER-POWER RADIATION SPECTROMETER

CROSS REFERENCE TO RELATED APPLICATIONS

This is the U.S. National Stage of International Application No. PCT/US2016/015147, filed Jan. 27, 2016, which was published in English under PCT Article 21(2), which in turn claims the benefit of U.S. Provisional Application No. 62/108,391, filed Jan. 27, 2015. The provisional application is incorporated herein in its entirety.

BACKGROUND

Radioisotope identification is performed through the measurement of gamma-ray energy, called gamma-ray spectroscopy. An ideal radiation spectroscopy device has good energy resolution and radiation detection efficiency in order to quickly and accurately identify radioisotopes and determine radiation dose.

Current devices capable of performing gamma spectroscopy have major drawbacks for mobile, mass-deployment, and personal applications. Conventional gamma ray spectrometers are large, bulky devices that require a bank of conditioning electronics and are thus confined to a laboratory environment. Those devices that are considered "portable" are still typically the size of a shoebox, heavy, and require large battery packs. Both of these types of devices are also expensive, thus making them cost-prohibitive for individuals and for mass-deployment by nations and organizations.

SUMMARY

The present embodiments relate generally to radiation detection. More specifically, it relates to a low-cost, compact, mass-producible radiation energy measurement device with radionuclide-specific search algorithms and different power-saving modes and configurations.

Disclosed are the embodiments of a low-cost, compact radiation spectrometer device with low-power, selective-spectroscopy capabilities. In one embodiment, these capabilities are achieved through the use of a radiation detector component connected to an electronics component. In an example embodiment, the radiation detector is responsible for converting the energy deposited by radiation interactions into an electrical signal. The spectrometer includes electronics responsible for electrical signal conditioning and processing stages. Additionally, different modes can be set (e.g., by a user) in order to conserve power when full spectroscopy mode (using an Analog-to-Digital Converter (ADC) in normal operating mode) is not needed.

The radiation spectrometer device uses a unique circuit design, where one comparator is used in a low-power operation mode to monitor for the presence of radiation-emitting material or radiation-generating machines by comparing a threshold count rate based on a previous background measurement to a current count rate. If the presence of either or both is detected, a control circuit can be used to activate an ADC so as to obtain a radiation energy measurement (spectroscopy mode). Various embodiments may then automatically set the threshold of two or more comparators to monitor a particular radiation energy level or a set of energy levels, allowing the ADC to be placed back in sleep mode while the comparators are used to continue to detect the radiation energy. For example, in one embodiment, a single comparator can be used, and the spectrometer can switch between spectroscopy mode (ADC is ON and the comparator is OFF) and integral counting mode (ADC is OFF or in low-power mode and the comparator is ON). During integral-counting mode, control circuitry records the number of comparator logic pulses generated by radiation interactions (e.g., detected radiation events) with radiation energy that is above an energy threshold level. The threshold level can be set using threshold voltage level supplied to one of the comparator inputs. A user may place the spectrometer in spectroscopy or integral-counting mode, or the spectrometer can automatically switch between integral-counting and spectroscopy mode (e.g., as explained herein below in reference to FIG. 6).

In another embodiment, the spectrometer can use two or more comparators so that spectroscopy, integral-counting, and window-counting modes can be used. In window-counting mode, at least two comparators can be used and threshold voltages can be applied to inputs of the comparators. The threshold voltages can be associated with an upper and lower energy bound, defining a desired energy range (or window). During window-counting mode, the control circuitry records the number of comparator logic pulses generated by radiation interactions (e.g., detected radiation events) with radiation energy that falls within the desired energy range. A user may place the spectrometer in spectroscopy, integral-counting mode, or window-counting mode, or the spectrometer can automatically switch between integral-counting, spectroscopy, and window-counting modes (e.g., as explained herein below in reference to FIG. 11).

In yet another embodiment, multiple integral-counting and multiple window-counting modes can be used. For example, two comparators can be used where each comparator is associated with a separate energy threshold level, and integral-counting can take place separately with regard to both thresholds (hence, multiple integral-counting mode). Similarly, two or more comparators can be used so as to define two or more separate desired energy ranges. Window-counting can be performed separately with regard to each desired energy range (hence, multiple window-counting mode).

Because of its low cost, the detector presented herein is also mass-deployable. Having many detectors in an area can help locate a source of radiation or map a radiation contamination distribution. When linked to an internet-based mapping service, a network of such detectors could act as a powerful tool for emergency management personnel. In the case of a nuclear emergency event, such as a nuclear detonation, a map of radiation levels would enable emergency personnel to direct those inside contamination zones to either shelter in place or evacuate depending on the radiation level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

DETAILED DESCRIPTION

Disclosed herein are a device and method for radiation energy measurement, also called radiation spectroscopy. This device, also called a "spectrometer", is composed of a radiation detector and readout electronics. The radiation detector and readout electronics are used to generate pulse waveforms proportional in some aspect to the amount of energy absorbed by the spectrometer from one or more radiation interactions. More than one radiation detector and set of readout electronics may be used in a given embodiment of the spectrometer depending on considerations such as cost, weight, volume, and detection efficiency.

Figure 1:
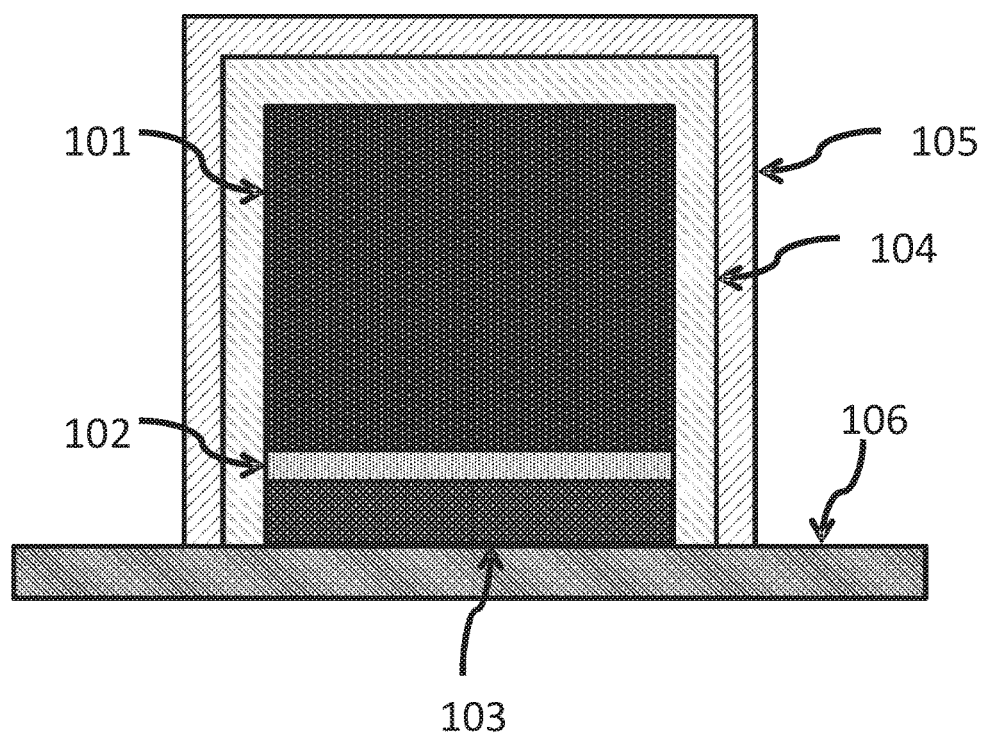
FIG. 1 shows an illustration of one embodiment of the radiation absorbing medium (detector) of a radiation spectrometer in a cut-away view to show the outer casing and inner components.

FIG. 1 shows an illustration of one embodiment of the radiation absorbing medium (detector) of a radiation spectrometer in a cut-away view to show the outer casing and inner components. Referring to FIG. 1, the radiation detector 100 is composed of a scintillator material 101, optical coupling gel 102, and Surface-Mount Technology (SMT) light-readout device 103. The scintillator material 101 is optically coupled to the light-readout device 103 by the optical coupling gel 102. The components 101-103 are surrounded by a light-reflective material 104, which is used to redirect photons generated in the scintillator 101 toward the light-readout device 103, which were not originally traveling toward the light-readout device. The light-reflective material 104 is surrounded by a light shield 105 in order to prevent photons not generated by the scintillator material 101 from being absorbed by the light-readout device 103.

The light-readout device 103 is communicatively and physically connected to a set of readout and processing electronics on a Printed Circuit Board (PCB) 106, which encompass electronics that are used to, e.g., condition and process radiation pulse waveforms and generate an energy histogram.

Two types of radiation detectors can be used for gamma-ray spectroscopy and in connection with the detector 100 disclosed herein: semiconductors and inorganic scintillators. Semiconductor detectors can be either single-element, such as silicon or germanium, or multi-element, such as CdZnTe (CZT). Inorganic scintillator-based detectors can use either a photomultiplier tube (PMT) or a Solid-State Photomultiplier (SSPM) to measure the light output from the scintillator. The optimal choice of radiation detector depends upon seven parameters: size, ruggedness, cost, ability to operate at low voltage, ability to operate at room temperature, gamma-ray detection efficiency, and energy resolution. Silicon photodiodes are small, rugged, operate at low voltages and room temperature, and have good energy resolution. However, they are expensive and have low gamma-ray detection efficiency. HPGe detectors have good detection efficiency and excellent energy resolution, but are fragile, large, expensive, and require high voltages and bulky cooling systems. CZT detectors are small, rugged, are able to operate at room temperature, and have good efficiency and excellent energy resolution. However, CZT detectors are expensive and require high voltages to operate. Inorganic scintillators mounted to PMTs are able to operate at room temperature, and have good gamma-ray detection efficiency and energy resolution. However, they are large, fragile, expensive, and require high voltages to operate. Inorganic scintillators mounted to SSPMs are small, rugged, inexpensive, operate on low-voltages and at room temperature, and have good radiation detection efficiency and energy resolution.

Given these choices, an inorganic scintillator coupled to a SSPM (SiPM) is a good choice for use in the spectrometer disclosed herein. An inorganic scintillator material with both high-Z and high light yield is desirable as such a material affords faster and more accurate radioisotope identification. Many inorganic scintillator materials fit these criteria, and CsI(Tl) can be a good candidate. In cases where neutron sources are expected to be present, neutron-sensitive scintillator materials, such as CLLB, CLLC, and CLYC, may be used to gain neutron sensitivity.

The light-readout device 103 for the spectrometer is preferably small, lightweight and matches the light wavelength spectrum of the scintillator material used in the spectrometer. The SSPM (or SiPM) is a good candidate for the light-readout device 103, and fills this role well compared to the more traditional PMT. SSPMs are more robust, compact, lower-power, and cost-effective when compared to PMTs. SSPMs are also insensitive to magnetic fields. Different models of SSPM are sensitive to different wavelengths of light, and are thus useable with many different scintillator materials. In the described embodiments, the SSPMs are also surface-mounted onto the PCBs, further saving weight and space and increasing durability. Using SMT SSPMs also makes the spectrometer easier to manufacture in large quantities, decreasing the cost of the device.

Figure 2:
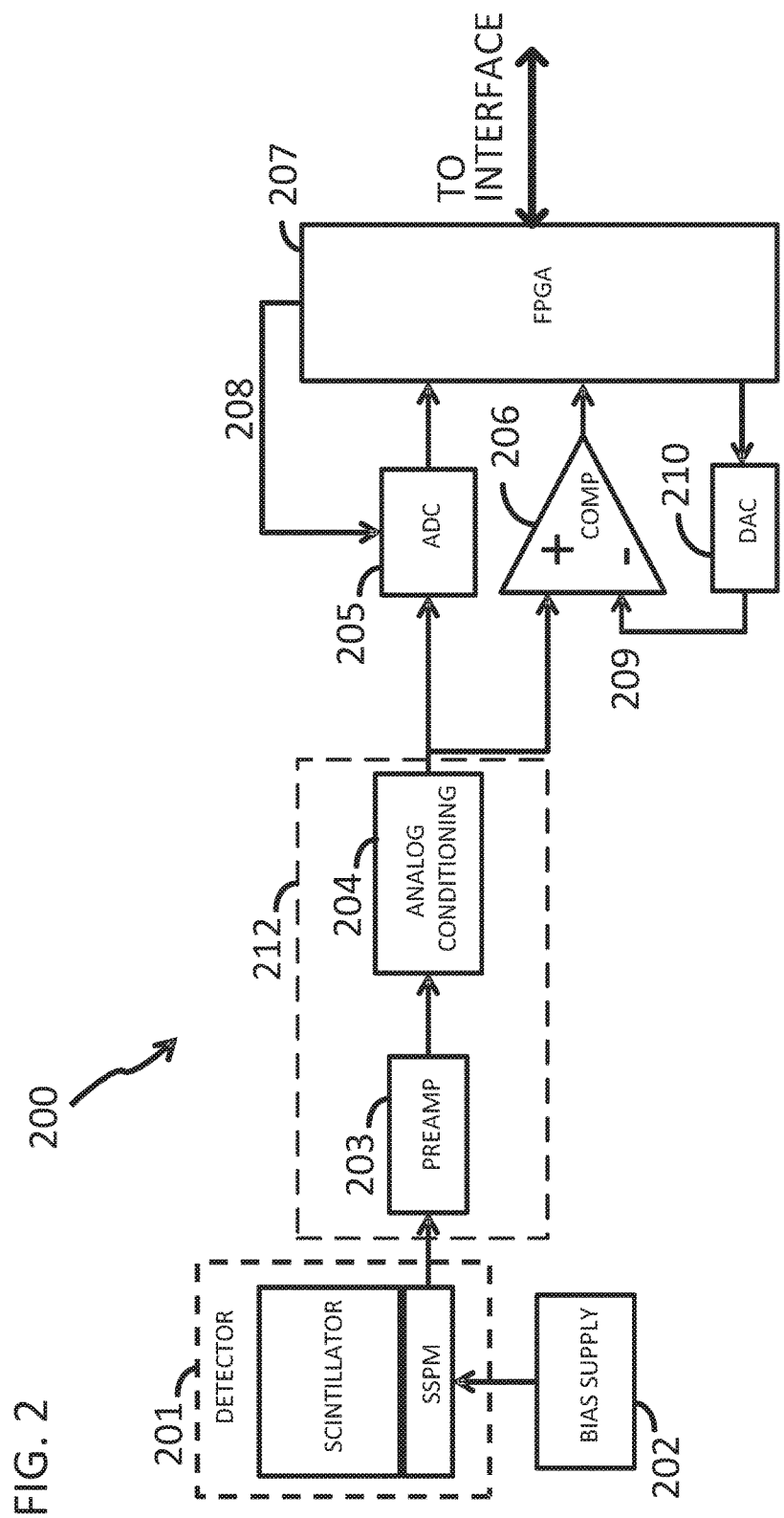
FIG. 2 shows an illustration of an example embodiment of a radiation spectrometer using an ADC and a single comparator.

FIG. 2 shows an illustration of an example embodiment of a radiation spectrometer 200 using an ADC and a single comparator. Referring to FIG. 2, the radiation detector 201 is composed of the scintillator material 101, optical coupling gel 102, light-readout device 103, light-reflective material 104, and light shield 105, as described above in reference to FIG. 1. A bias voltage supply 202 is also available in order to power the light-readout device 103 in the detector 201. The light-readout device 103 (which can be a solid state photo-multiplier, or SSPM) is communicatively connected to an electronics conditioning suite 212 for conditioning of the signals generated by the detector 201. For example, the electronics conditioning suite 212 can include a preamplifier 203 and an analog conditioning circuit 204. The output of the preamplifier 203 is communicatively connected to an input of the analog conditioning circuit 204. The output of the analog conditioning circuit 204 is communicatively connected to an Analog-to-Digital Converter (ADC) 205 and the non-inverting signal input of a comparator 206. The outputs of the ADC 205 and the comparator 206 are communicatively connected to a Field-Programmable Gate Array (FPGA) 207. Any control circuitry can be used in place of the FPGA 207, such as a DSP, a microprocessor, a microcontroller, an ASIC, or other device well known to those familiar with the art.

The ADC 205 has at least one additional input 208 that is used to enable a "sleep mode" (or another low-power mode), during which mode the ADC 205 uses significantly less power. The ADC 205 (and any of the ADCs used in disclosed embodiments herein) is a free-running device (i.e., as long as it is turned ON it continuously samples the input signal at its sampling rate and continuously outputs the digitized samples). The sampling rate and resolution of the ADC are functions of the specific radiation detector 201 used in the spectrometer. Those detectors with a shorter decay time will require an ADC with a higher sampling rate in order to accurately measure the energy of the incoming signals. Those detectors with better energy resolution will require an ADC with a larger number of bits in order to accurately measure the energy of the incoming signals. The choice of ADC used in the spectrometer are design choices that will depend upon cost, weight, volume, complexity, and power.

In the illustrated embodiments, the spectrometer 200 uses one or more comparators in order to switch between spectroscopy mode and various low-power modes, as explained herein below. Example low-power modes of spectrometer operation include integral-counting mode, window-counting mode, multiple integral-counting mode, and multiple window-counting mode. Other methods for implementing the radiation measurement functions described in the integral-counting and window-counting modes are possible. However, comparators are desirable because they consume very little power even when active. The method for implementing the radiation measurement functions of the power-conserving modes is a design choice that will depend upon cost, weight, volume, complexity, and power.

The inverting signal input 209 of the comparator 206 is connected to a voltage source that is used to apply a voltage threshold and hysteresis to the device. The voltage source can be a Digital-to-Analog Converter (DAC) 210 communicatively connected to the FPGA for applications in which an adjustable lower threshold is useful. The FPGA is communicatively connected to an interface (e.g., the computing device 1210 in FIG. 12) that allows the user to view the information recorded on the FPGA and communicate voltage changes to the DAC 210. The voltage changes to the DAC 210 result in applying a threshold voltage at the inverting signal input 209 of the comparator 206. The threshold voltage at the input 209 can be used to set a minimum desired energy level for detected radiation events, so that radiation events with energies above the minimum desired energy threshold can be counted (or a detection of an event above the minimum threshold can be used to trigger a temporary switch of the ADC from a low-power/sleep mode to normal operating mode to perform a more precise measurement in spectroscopy mode, as explained below).

The embodiment in FIG. 2 uses a single comparator 206, and is able to support two specific operational modes: spectroscopy and integral-counting modes, listed in Table 1. In spectroscopy mode, the FPGA 207 performs pulse processing techniques on the digitized pulses from ADC 205 in order to generate an energy histogram 301.

Figure 3:
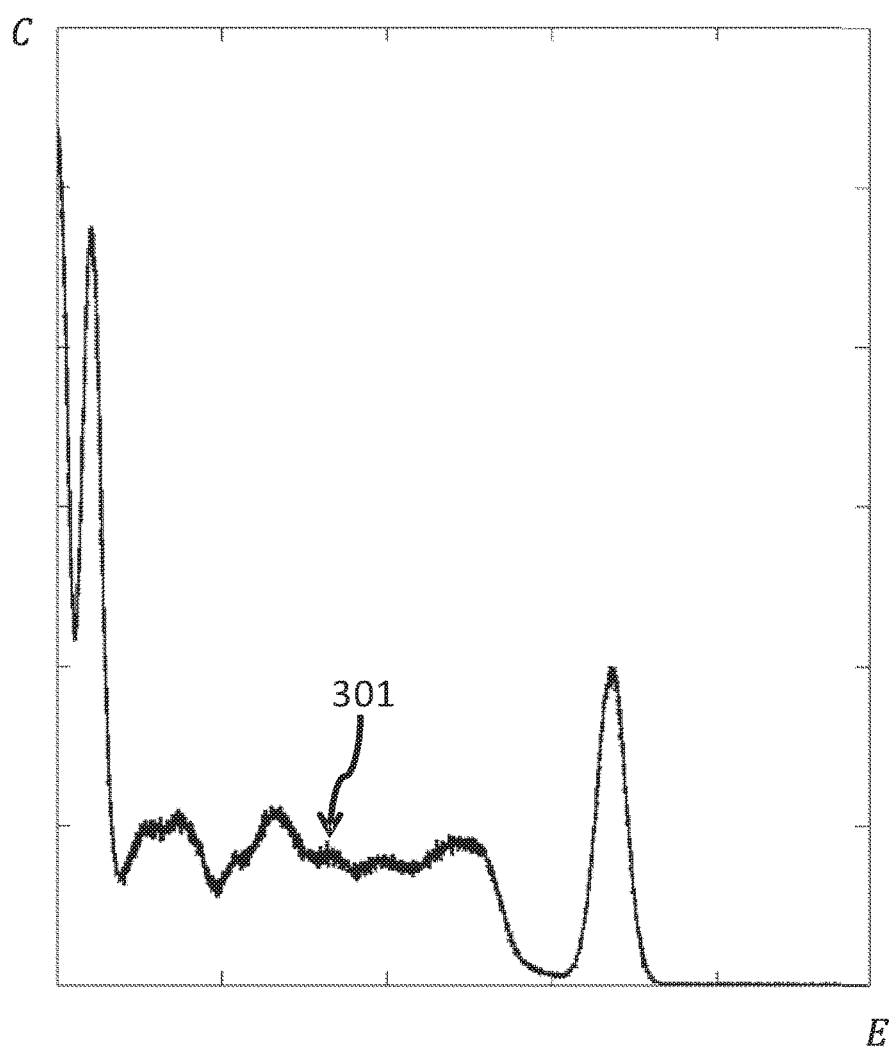
FIG. 3 shows an illustration of a gamma-ray radiation energy histogram relating to the operation of a spectrometer in a spectroscopy mode.

FIG. 3 shows an illustration of a gamma-ray radiation energy histogram relating to the operation of a spectrometer in a spectroscopy mode. Referring to FIG. 3, the energy histogram 301 represents the number of counts (C) recorded at a given energy (E) by the device 200. The FPGA 207 thus replaces the functions of traditional, bulkier analog electronics components, such as pulse-shaping and MCA modules. However, the ADC 205 consumes a relatively large amount of power, which is especially undesirable when the device is powered by battery. The device 200 will thus be able to activate any of a number of low-power modes, in which the ADC is set to "sleep mode" (or another low-power mode) using ADC input 208, reducing the power consumption of the spectrometer. One possible low-power mode is "integral-counting" mode. The comparator 206 is used in the low-power mode to transform analog signals output by the conditioning circuit 204 into logic signals, which have two output states: "high" and "low".

TABLE 1

| Mode | ADC power | Use Comparator |
|---|---|---|
| Spectroscopy | ON | NO |
| Integral-Counting | OFF | YES |

Figure 4:
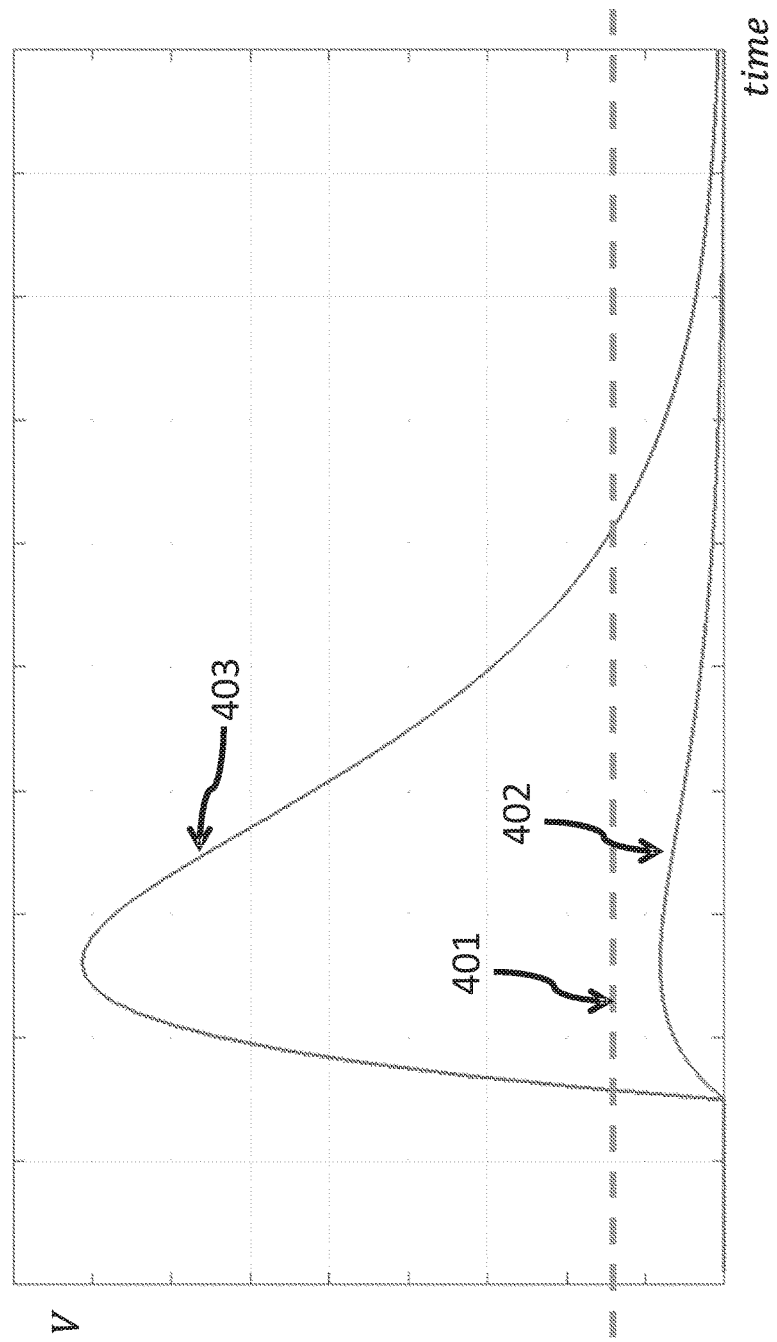
FIG. 4 shows an illustration of two radiation detector pulses relating to the operation of the spectrometer of FIG. 2 in an integral-counting mode.
Figure 5:
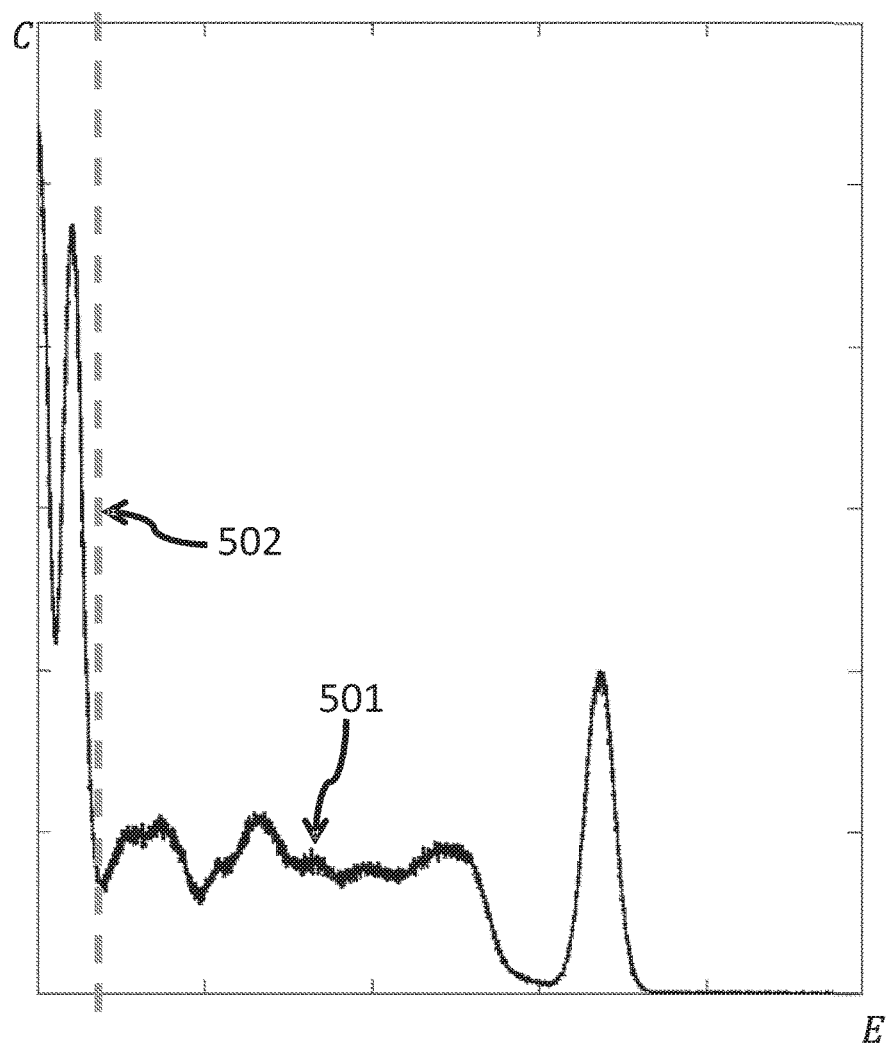
FIG. 5 shows an illustration of a gamma-ray radiation energy histogram relating to the integral-counting mode for the spectrometer of FIG. 2.

FIG. 4 shows an illustration of two radiation detector pulses relating to the operation of the spectrometer of FIG. 2 in an integral-counting mode. FIG. 5 shows an illustration of a gamma-ray radiation energy histogram relating to the integral-counting mode for the spectrometer of FIG. 2. In integral-counting mode, the FPGA 207 records the number of comparator logic pulses generated by radiation interactions in the radiation detector 201. A voltage threshold at input 209 (e.g., threshold 401) for the comparator 206 is set such that its value is just above the noise threshold for the analog conditioning circuit 204 output. If a voltage pulse 402 from the analog conditioning circuit 204 is below the comparator voltage threshold 401, the comparator 206 logic output will remain in the "low" state. If a given voltage pulse 403 from the analog conditioning circuit 204 exceeds the comparator voltage threshold 401, the logic output will change to "high". The "high" logic output will be detected by the FPGA 207, which will then increment the number of counts it has recorded by one. This mode does not record radiation energy information from each event. In the histogram of energies 501 in FIG. 5 that the FPGA 207 would normally record in spectroscopy mode, the comparator voltage threshold effectively sets an energy threshold 502 for radiation interaction events. Integral-counting mode then effectively sums all events above the energy threshold into the total number of counts (C).

The embodiment in FIG. 2 can be used in either a manual or automatic operation. In manual operation, the user can select (e.g., via the computing device 1210) which mode the device 200 will operate in: e.g., spectroscopy or integral-counting. In automatic operation, the spectrometer 200 is able to switch between integral-counting and spectroscopy modes based on the measurements it takes. An example of automatic operation is shown in FIG. 6.

Figure 6:
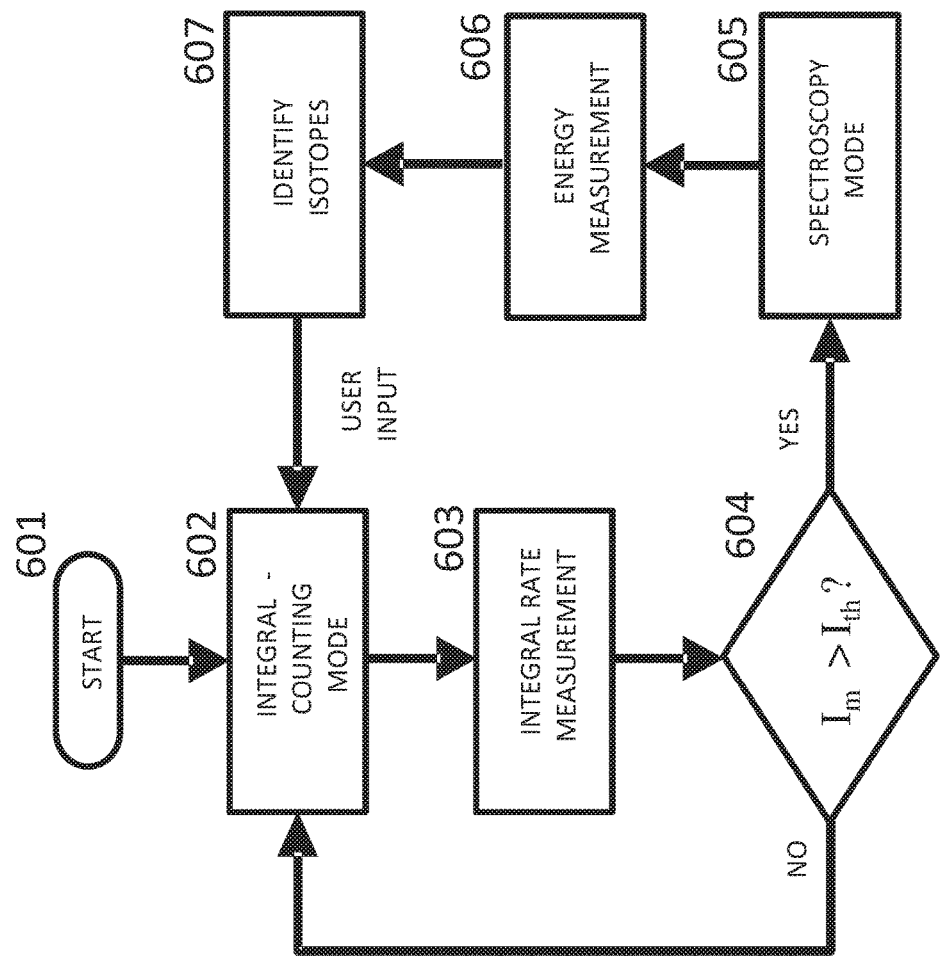
FIG. 6 shows a flow chart of automatic operation and switching between integral-counting and spectroscopy modes for the spectrometer of FIG. 2.

FIG. 6 shows a flow chart of automatic operation and switching between integral-counting and spectroscopy modes for the spectrometer of FIG. 2. Referring to FIG. 6, the device starts at 601 in integral-counting mode 602, where the ADC 205 is off (or in a low-power mode) and the FPGA 207 monitors the comparator voltage output for comparator 206. The spectrometer 200 makes an integral count measurement at 603, recording the number of counts from the comparator for a certain fixed amount of time. At the end of this time period, the number of recorded counts, $I_m$, is compared (at 604) against a count threshold, $I_{th}$, that takes the natural radiation background into account. If $I_m$ is less than or equal to $I_{th}$, then the spectrometer 200 remains in integral-counting mode. If $I_m$ is greater than $I_{th}$, the spectrometer switches to spectroscopy mode (at 605). In spectroscopy mode, the ADC 205 is turned ON in order to perform a radiation energy measurement (at 606). Once the energy measurement is complete, built-in algorithms may be able to identify the radioisotopes detected, estimate the radiation dose to the user, and/or perform other radiation energy calculations or estimations. Once the user no longer needed the spectroscopy mode, they would be able to switch the spectrometer back to integral-counting mode, a desirable feature for a battery-powered embodiment. In the alternative, the spectrometer 200 may switch the ADC 205 ON only temporarily so that the energy measurement (at 606) and isotope identification (at 607) can be performed, and then may switch the ADC 205 OFF (or in low-power mode), and then transition back to integral-counting mode (at 602). In this regard, the device 200 can be switched back to integral-counting mode after a certain amount of time for a fully-automatic implementation.

Figure 7:
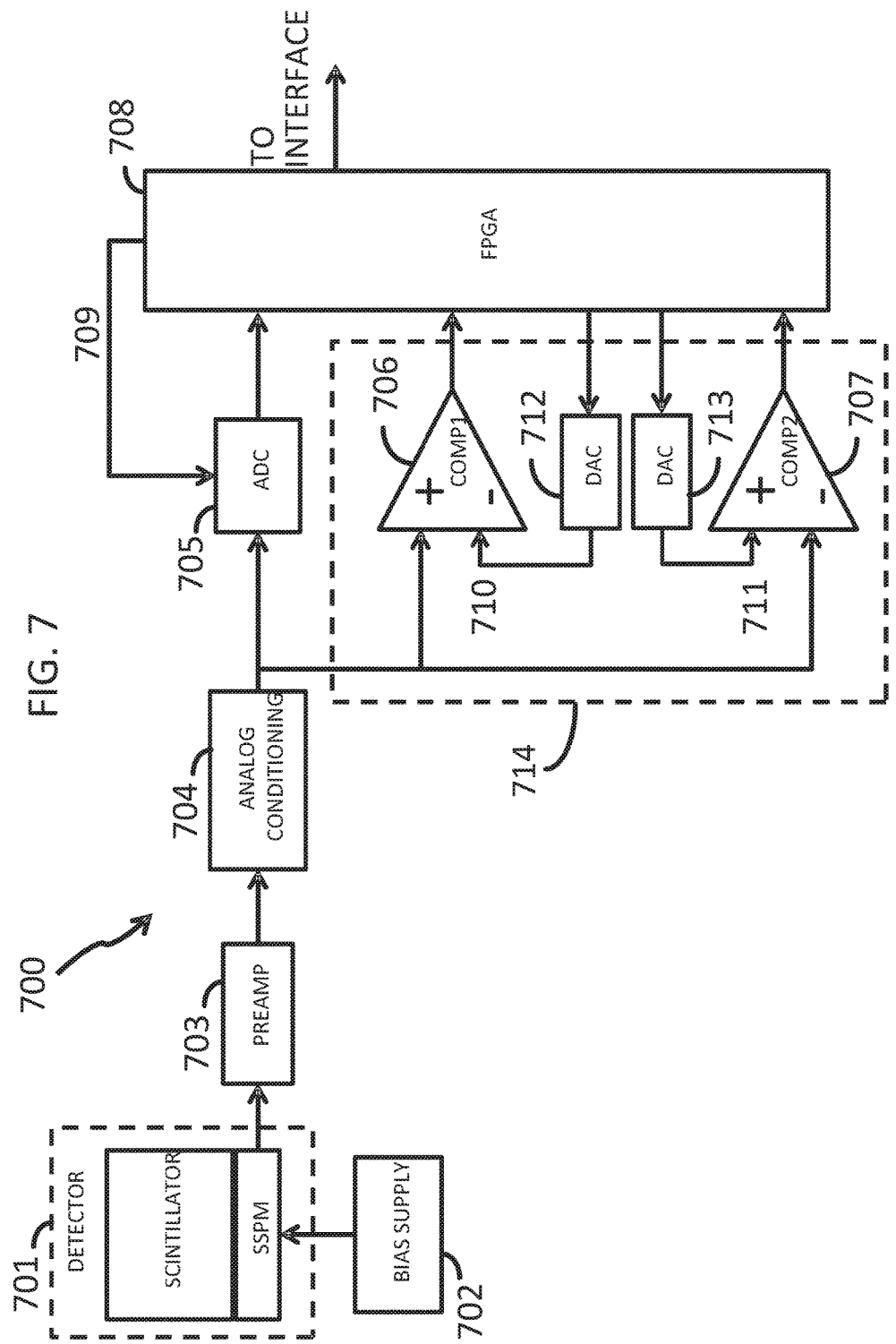
FIG. 7 shows an illustration of another example embodiment of a radiation spectrometer using an ADC and two comparators.

FIG. 7 shows an illustration of another example embodiment of a radiation spectrometer 700 using an ADC and two comparators. Referring to FIG. 7, the illustrated spectrometer 700 is similar to the spectrometer 200, except that two comparators are used instead of one. The radiation detector 701 is composed of the scintillator material 101, optical coupling gel 102, light-readout device 103, light-reflective material 104, and light shield 105 (as illustrated in FIG. 1). A bias voltage supply 702 is also available in order to power the light-readout device 103. The light-readout device 103 in the detector 701 is communicatively connected to a preamplifier 703, the output of which is communicatively connected to an analog conditioning circuit 704. The output of the analog conditioning circuit 704 is communicatively connected to an ADC 705, the non-inverting signal input of one comparator 706, and the inverting signal input of another comparator 707. The outputs of the ADC 705 and both comparators 706-707 are communicatively connected to an FPGA 708. Any control circuitry can be used in place of the FPGA 708, such as a DSP, a microprocessor, a microcontroller, an ASIC, and so forth. The ADC 705 has at least one additional input 709 that is used to enable a "sleep mode" (or another low-power mode), in which mode the ADC 705 uses significantly less power.

The inverting signal input 710 of the comparator 706 is connected to a voltage source that is used to apply a voltage threshold and hysteresis to the device. Similarly, the non-inverting input 711 of the second comparator 707 is connected to a voltage source, separate from that connected to 710, that is used to apply a voltage threshold and hysteresis to the device. The voltage thresholds 710 and 711 are generated by two DACs 712, 713 communicatively connected to the FPGA 708. Having the DACs 712-713 controlled by the FPGA 708 allows the algorithm implemented in the FPGA to change the comparator voltage thresholds automatically. The arrangement of comparators 706, 707 and DACs 712, 713 supplying the comparator voltage thresholds 710, 711 can be referred to as a "windowing configuration" 714 (e.g., based on a window or a range of desired energies being defined using the threshold voltages at inputs 710-711). The FPGA 708 is communicatively connected to an interface (e.g., device 1210) that allows the user to view the information recorded on the FPGA 708 or issue control signals (e.g., to manually switch the ADC ON to function in spectroscopy mode, or to set up the threshold voltage levels at inputs 710-711).

The illustrated embodiment in FIG. 7 is capable of supporting four specific operational modes: spectroscopy, integral-counting, multiple integral-counting, and window-counting, listed in Table 2. In spectroscopy mode, the FPGA 708 performs pulse processing techniques on the digitized pulses from ADC 705 in order to generate an energy histogram 301 shown in FIG. 3. The FPGA 708 thus replaces the functions of traditional, bulkier analog electronics components, such as pulse shaping and MCA modules. However, the ADC 705 consumes a relatively large amount of power, which is especially undesirable when the device is powered by battery. The device 700 can activate any of a number of low-power modes, in which the ADC is set to "sleep mode" (or another low-power mode) using ADC input 709, reducing the power consumption of the spectrometer. Two possible low-power modes are "integral-counting" mode and "window-counting" mode. Comparators one (706) and two (707) are used in the low-power modes to transform analog signals into logic signals, which have two output states: "high" and "low".

TABLE 2

| mode | ADC power | Use COMP1? | Use COMP2? |
| --- | --- | --- | --- |
| spectroscopy | ON | NO | NO |
| integral-counting | OFF | YES | NO |
| window-counting | OFF | YES | YES |
| Multiple integral-counting | OFF | YES | YES |

The FPGA 708 is responsible for performing digital pulse processing techniques on incoming radiation pulses from the ADC 705, and generating an energy histogram of radiation interaction events. The FPGA 708 is also responsible for recording the rate of radiation interaction events generated in the integral-counting and window-counting modes. In some embodiments, the FPGA 708 is also responsible for generating the signal used to turn off the ADC 209/705. In some embodiments, signals generated by the FPGA 708 may also be used to set the voltage threshold(s) of the comparator (s), either directly or in conjunction with other devices mentioned previously, such as the DACs 210, 712, 713.

Figure 8:
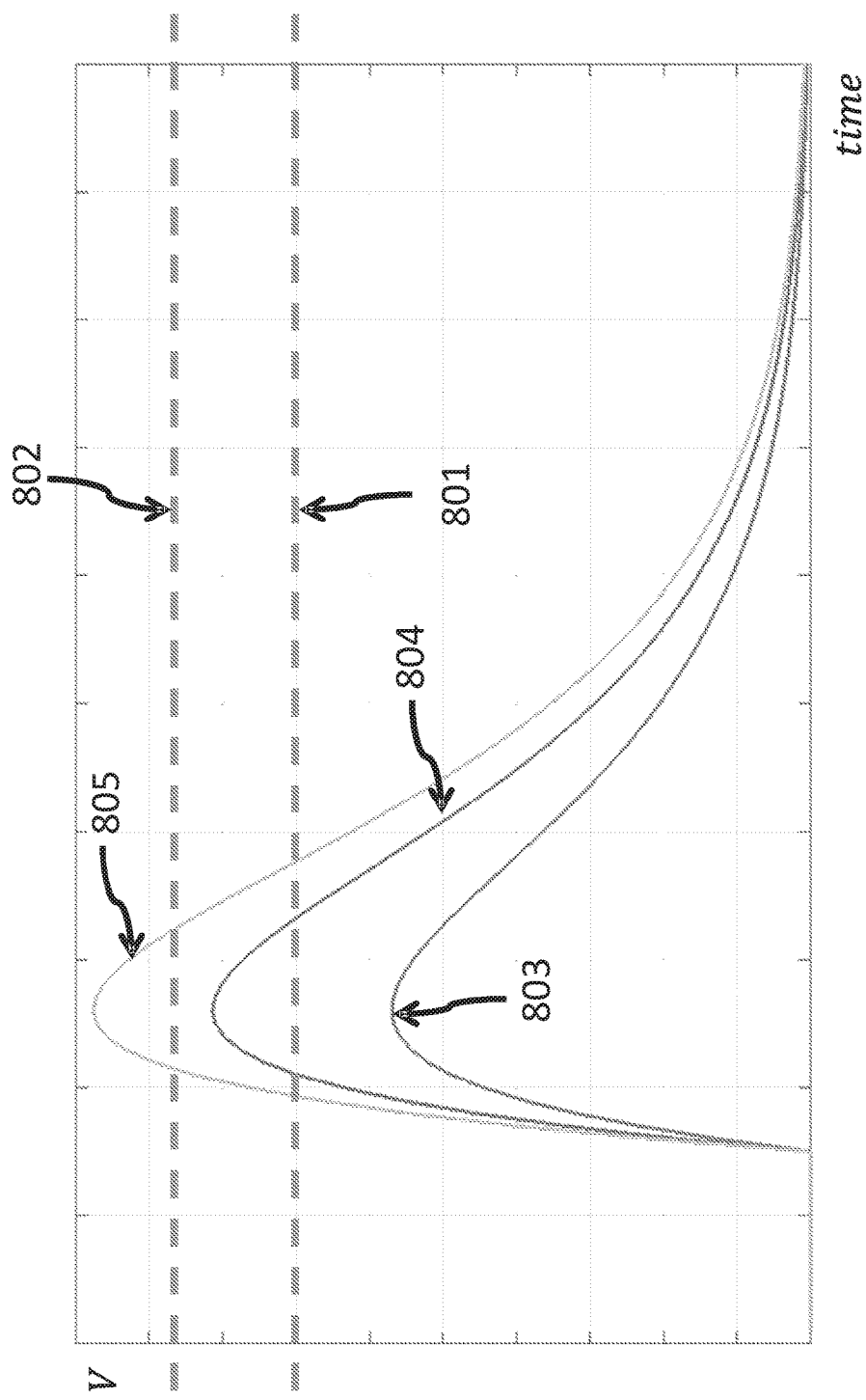
FIG. 8 shows an illustration of three radiation detector pulses relating to the operation of the spectrometer of FIG. 7 in a window-counting mode.
Figure 9:
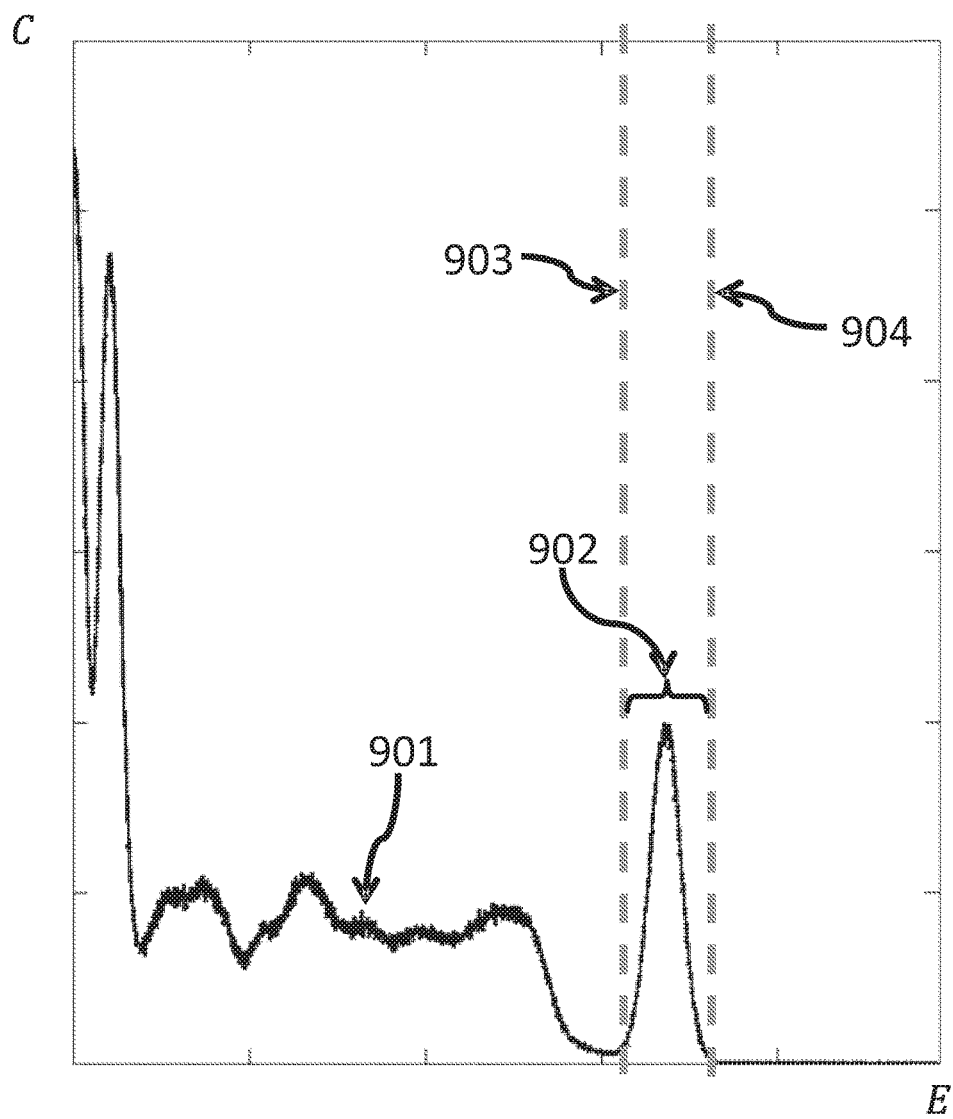
FIG. 9 shows an illustration of a gamma-ray radiation energy histogram relating to the window-counting mode for the spectrometer of FIG. 7.

FIG. 8 shows an illustration of three radiation detector pulses relating to the operation of the spectrometer of FIG. 7 in a window-counting mode. FIG. 9 shows an illustration of a gamma-ray radiation energy histogram relating to the window-counting mode for the spectrometer of FIG. 7. In integral-counting mode, only comparator 706 can be used and the FPGA 708 records the number of comparator logic pulses generated by radiation interactions in the radiation detector 701. A voltage threshold at input 710 (e.g., 801) for comparator one 706 is set such that its value is just above the noise threshold for the analog conditioning circuit 704 output. If a voltage pulse 803 from the analog conditioning circuit 704 is below the comparator voltage threshold 801, the comparator one logic output will remain in the "low" state. If a given voltage pulse 804 from the analog conditioning circuit 704 exceeds the comparator voltage threshold 801, the logic output will change to "high". The "high" logic output from comparator one 706 will be detected by the FPGA 708, which will then increment the number of counts it has recorded by one. This mode does not record radiation energy information from each event. In the histogram of energies (e.g., 501) the FPGA would normally record in spectroscopy mode, the comparator voltage threshold effectively sets an energy threshold (e.g., 502) for radiation interaction events. Integral-counting mode then effectively sums all events above the energy threshold into the total number of counts.

In accordance with an example embodiment of the disclosure, a multiple integral-counting mode can be used when multiple comparators are connected as comparator 706 (e.g., the inverting input of each comparator is connected to the FPGA 708 via a voltage source, such as a DAC). Each comparator will then, in effect, define a separate threshold and the FPGA 708 can count radiation events with energies that are above one or more of the thresholds.

In window-counting mode, the FPGA 708 records the number of radiation interactions in the radiation detector that fall into an energy range of interest. A first voltage threshold applied to input 710 is shown at 801 for comparator one 706, and is set such that its value corresponds to the lower end of the energy range of interest. A second voltage threshold applied to input 711 is shown at 802 for comparator two 707 and is set such that its value corresponds to the upper end of the energy range of interest. If a voltage pulse 803 from the analog conditioning circuit 704 is below both comparator thresholds 801, 802, the logic output of comparator one 706 will remain in the "low" state and the logic output of comparator two will remain in the "high" state. If a voltage pulse 804 from the analog conditioning circuit is above the voltage threshold of comparator one but below the voltage threshold of comparator two, the logic output of comparator one (706) will change to "high" and the voltage output of comparator two (707) will remain in the "high" state. If a voltage pulse 805 from the analog conditioning circuit exceeds both comparator thresholds, the logic output of comparator one will change to "high" and the logic output of comparator two will change to "low". The FPGA 708 will increment the number of counts recorded by one only when the logic output of both comparators 706-707 are "high" at the same time (e.g., pulse 804 falls within the desired energy range and will record "high" outputs for both comparators). This mode does not record radiation energy information from each event. In the histogram of energies 901 that the FPGA 708 would normally record in spectroscopy mode, window-counting mode effectively counts radiation interaction events for a specific energy region of interest (e.g., region 902 is an example). In the histogram of energies 901, the comparator one (706) voltage threshold effectively sets an energy threshold 903 for radiation interaction events at the lower bound of the energy region of interest. The comparator two (707) voltage thresholds effectively sets an energy threshold 904 for radiation interactions events at the upper bound of the energy region of interest. These two thresholds set up an "energy window", and only events with an energy that falls inside this window are counted.

Figure 10:
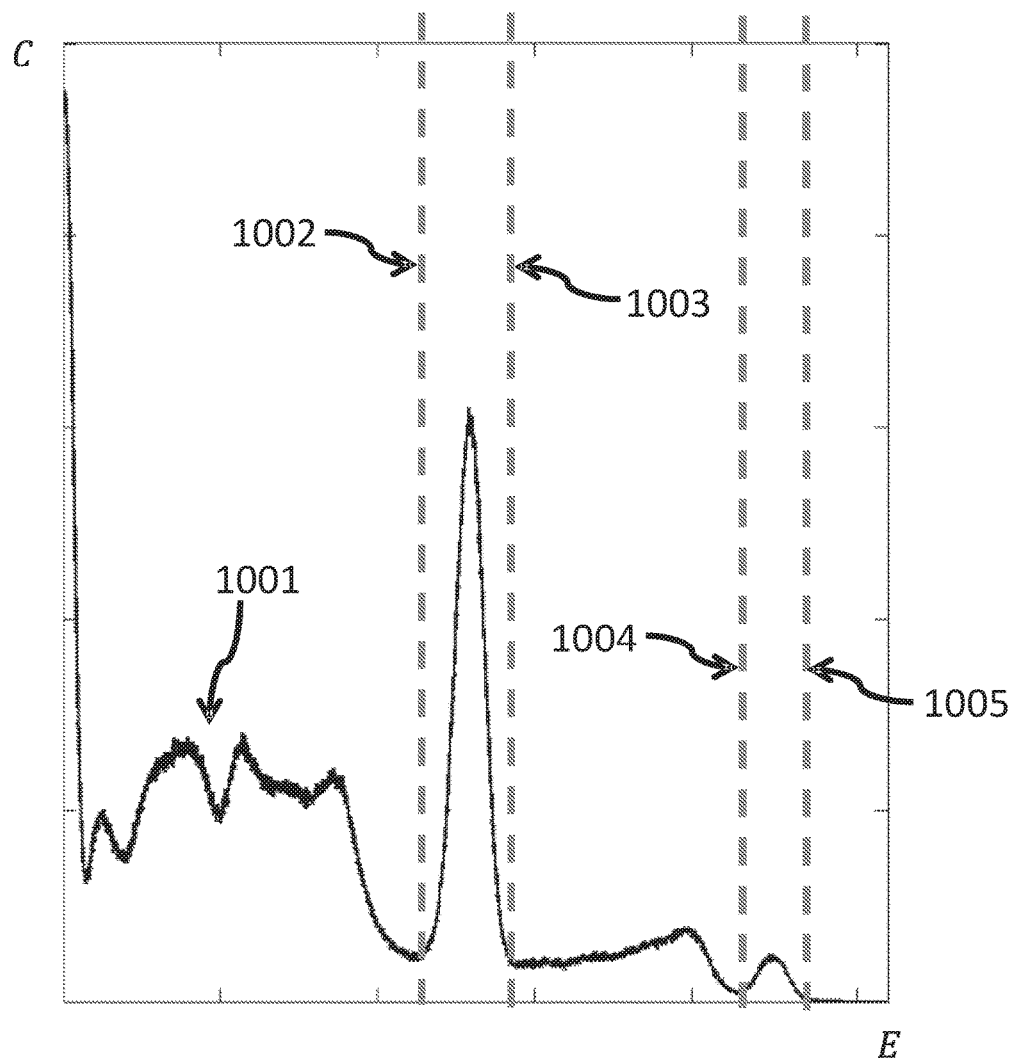
FIG. 10 shows an illustration of a gamma-ray radiation energy histogram relating to a window-counting mode that monitors two separate windows, when the spectrometer of FIG. 7 uses more than two comparators.

FIG. 10 shows an illustration of a gamma-ray radiation energy histogram relating to a window-counting mode that monitors two separate windows, when the spectrometer of FIG. 7 uses more than two comparators. A variation of window-counting mode can be implemented, called "multiple window-counting mode", in which multiple energy windows are defined. The implementation of this mode requires two additional comparators and two additional DACs, set up in the windowing configuration 714, for every additional energy window beyond the first. The additional windowing configurations would then each be able to define additional energy windows, such as those in FIG. 10, which is an example where two windowing configurations are used. In the spectrum of energies 1001, one windowing configuration defines the thresholds 1002-1003, and an additional windowing configuration defines the thresholds 1004-1005. The ability to define multiple energy windows is useful for some applications well known to those familiar with the art. The number of windowing configurations used will be a design choice that will depend on factors such as application, complexity and power, which are well known to those familiar with the art.

The spectrometer 700 can be used in either a manual or automatic operation. In manual operation, the user (e.g., via device 1210) selects which mode the device will operate in: spectroscopy, integral-counting, multiple integral-counting, window-counting, or multiple window-counting. In automatic operation, the spectrometer 700 is able to switch between different modes based on a preset search algorithm and the measurements it makes in that mode. Different search algorithms may be implemented based on the peak with the largest number of counts, the peak at the largest energy, or the energy emission of a particular radionuclide.

Figure 11:
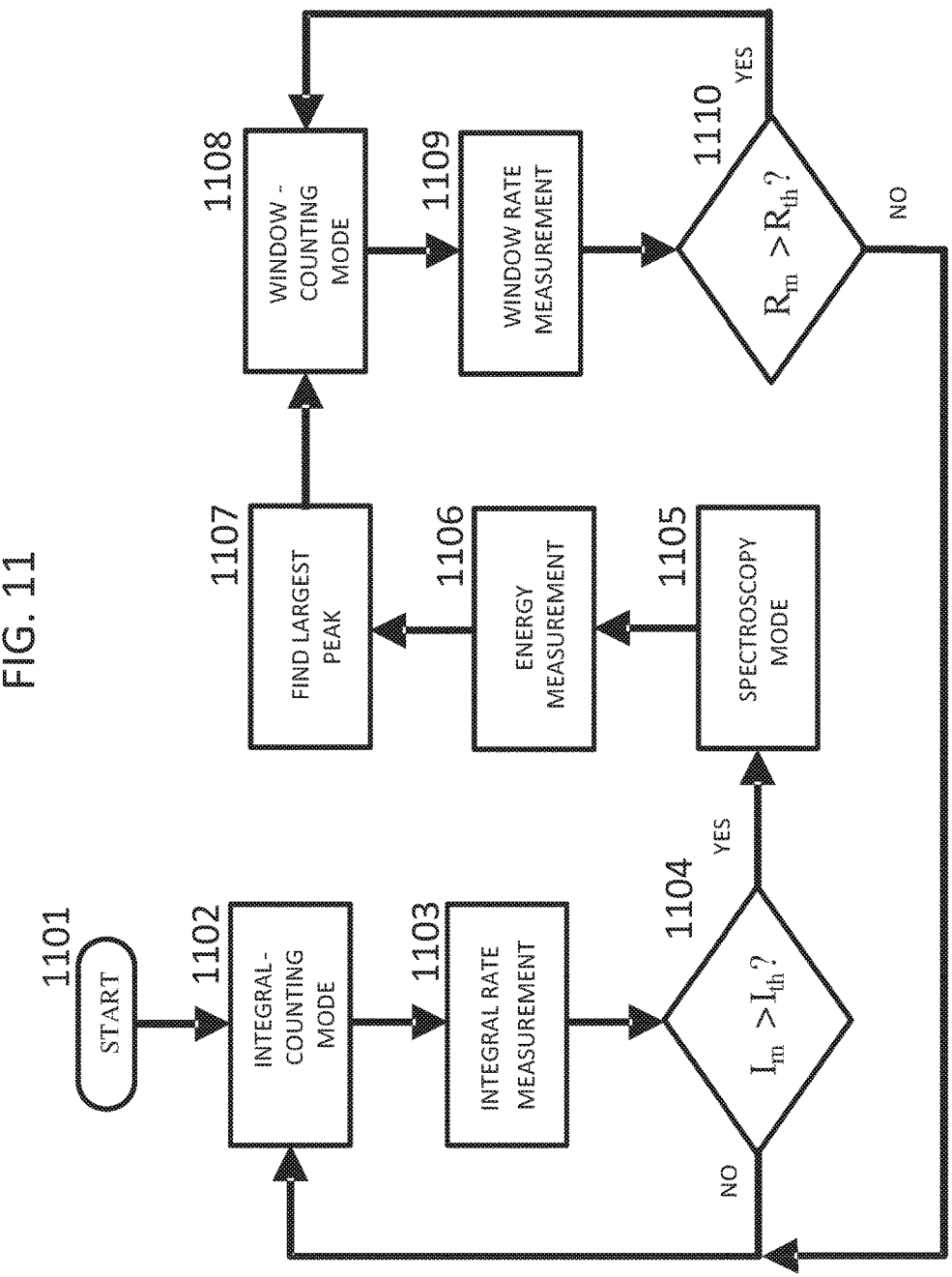
FIG. 11 shows a flow chart of automatic operation and switching between integral-counting, spectroscopy, and window-counting modes for the spectrometer of FIG. 7.

FIG. 11 shows a flow chart of automatic operation and switching between integral-counting, spectroscopy, and window-counting modes for the spectrometer of FIG. 7. An example of automatic operation based on the peak with the largest number of counts is shown in FIG. 11. The device 700 starts (at 1101) in integral-counting mode 1102, where the ADC 705 is OFF (or otherwise in low-power mode), and the FPGA 708 monitors the comparator one (706) voltage output. The spectrometer 700 makes an integral count measurement (at 1103), recording the number of counts from the comparator 700 for a certain fixed amount of time. At the end of this time period, the number of recorded counts, $I_m$, is compared (at 1104) against a count threshold, $I_{th}$, that takes background into account. If $I_m$ is less than or equal to $I_{th}$, then the spectrometer 700 remains in integral-counting mode. If $I_m$ is greater than $I_{th}$, the spectrometer switches to spectroscopy mode (at 1105). The ADC 705 is then turned on for a short period of time in order to perform a radiation energy measurement (at 1106).

Once the energy measurement is complete, the ADC 705 is turned off and the algorithm will find the radiation energy peak (at 1107). The spectrometer will then switch to window-counting mode (at 1108), setting the upper and lower comparator voltage thresholds, using the DACs 712, 713, around the largest energy peak and monitoring both comparator outputs. The spectrometer then performs a window-count measurement (at 1109) for a certain fixed amount of time. At the end of this time period, the number of recorded counts, $R_m$, is compared (at 1110) against a count threshold, $R_{th}$, that takes background radiation into account. If $R_m$ is greater than $R_{th}$, the spectrometer remains in window-counting mode. If $R_m$ is less than or equal to $R_{th}$, then the spectrometer 700 switches to integral-counting mode. The window-counting mode measurements can be periodically output (or displayed in real-time) via the device interface. The flow in FIG. 11 is an example of automatic operation. Other algorithms can be used for automatic operation and will be a design choice that will depend on factors such as application, complexity and power, which are well known to those familiar with the art.

Figure 12:
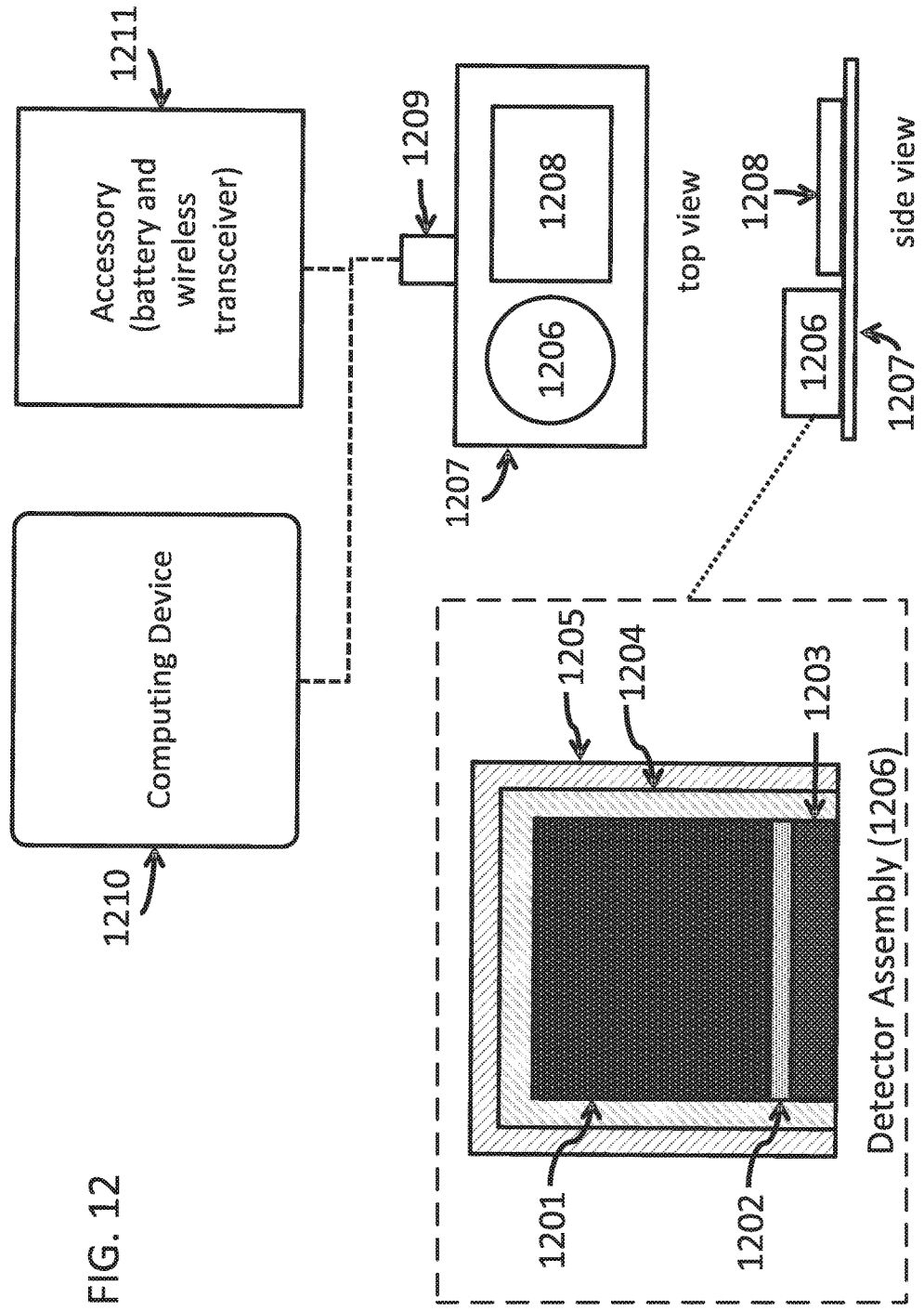
FIG. 12 shows an illustration of an example spectrometer implementation on a Printed Circuit Board (PCB) and using a power connector.

FIG. 12 shows an illustration of an example spectrometer implementation on a PCB and using a power connector. Referring to FIG. 12, the scintillator material 1201, optical coupling gel 1202, surface-mount technology (SMT) light-readout device 1203, light-reflective material 1204, and light shield 1205, are encompassed in the detector assembly 1206. The detector assembly 1206 is mounted to a printed circuit board (PCB) 1207, on which are also mounted the processing electronics 1208 and a digital communications and power connector 1209. The detector assembly 1206 is communicatively connected to the processing electronics 1208, which are in turn communicatively connected to the digital communications and power connector 1209. The processing electronics can include the preamplifier (203, 703), the analog conditioning circuit (204, 704), the ADC (205, 705), the FPGA (207, 708), and the one or more comparators (206, 706, 707) with corresponding DACs (210, 712, 713). The digital communications and power connector 1209 can take any of several specific forms, such as USB or any other type of connector. The digital communications and power connector 1209 can be connected to different devices, such as a computing device 1210 or accessory 1211 (consisting of, e.g., a battery and a wireless transceiver).

When connected to the computing device 1210 (e.g., a smartphone, a tablet, or a laptop computer), the battery of the computing device 1210 can power the spectrometer, and software (e.g., an application) running on the computing device 1210 can function as a user interface for performing one or more user-controlled functions disclosed herein (e.g., setting up threshold voltages, manually switching the ADC from low-power mode to normal operating mode, and so forth). When connected to the accessory 1211, the built-in battery of the accessory 1211 can power the spectrometer device. The wireless transceiver of the accessory 1211 allows another wireless-capable device, such as a smartphone or a computer, to host a program that serves as the user interface. The interface communicatively connected to the FPGA via the connector 1209 allows the user of the spectrometer to change modes and apply certain settings. The interface can take any of several different forms, such as built-in LCD screen and push-buttons, USB connection to a personal computer, or Wi-Fi connection to a mobile device. The choice of interface will depend on ease of use, market demand, application, cost, weight, volume, complexity, and power. For example, for personal radiation dosimetry applications, the interface might be the user's mobile phone since such devices are popular and easy to use. In this case, the FPGA could be communicatively connected to a Wi-Fi or Bluetooth transceiver that connects to the user's mobile phone, allowing the user to communicate with the spectrometer. This also reduces spectrometer weight, volume, and cost compared to a built-in interface.

Figure 13:
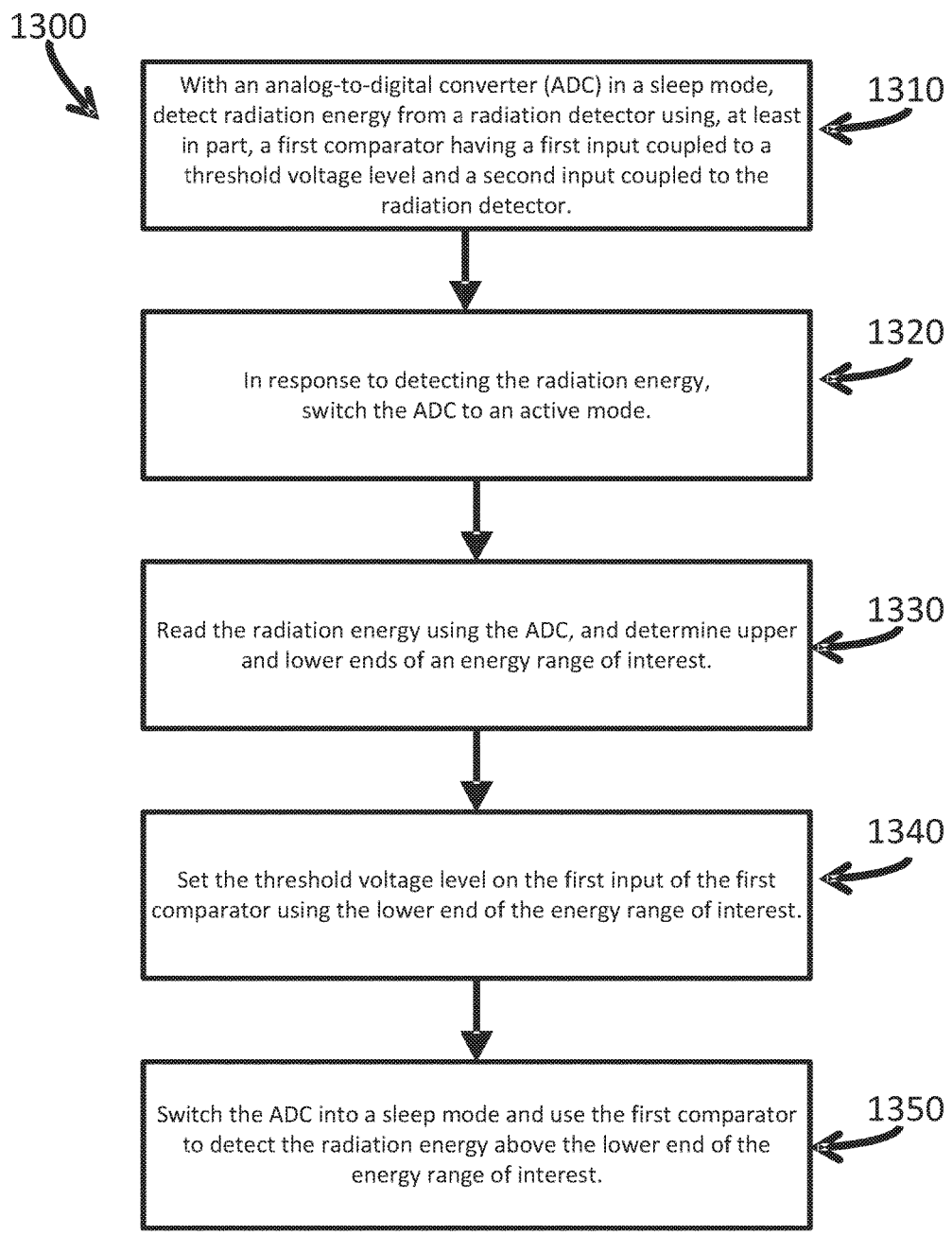
FIG. 13 is a flow diagram of an example method for detecting radiation energy, in accordance with an example embodiment of the disclosure.

FIG. 13 is a flow diagram of an example method for detecting radiation energy, in accordance with an example embodiment of the disclosure. Referring to FIGS. 7 and 13, the example method 1300 for detecting radiation energy can start at 1310, when the spectrometer 700 can detect radiation energy via the detector 701 and using, at least in part, a first comparator 706 having a first input (710) coupled to a threshold voltage level and a second input coupled to the radiation detector (701). The analog-to-digital converter (ADC) 705 can be initially in a sleep mode, while the radiation energy is detected. At 1320, in response to detecting the radiation energy, the FPGA 708 can switch the ADC 705 to an active mode. At 1330, the FPGA 708 can read the detected radiation energy using the ADC 705, and determine upper and lower ends of an energy range of interest. For example, the FPGA can determine upper and lower bounds of a desired energy range based on a peak energy reading obtained when the ADC 705 is operating in spectroscopy mode (i.e., ADC 705 is in normal operating mode). At 1340, the FPGA 708 can set the threshold voltage level on the first input (710) of the first comparator (706) using the lower end of the energy range of interest. At 1350, the FPGA 708 switches the ADC 705 into a sleep mode, and uses the first comparator (706) to detect the radiation energy that is above the lower end of the energy range of interest.

It will be readily understood by one of ordinary skill in the art that the exemplary systems, methods, and apparatus described herein should not be construed as being limiting in any way, and are not limited to any specific aspect or feature or combinations thereof.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In some examples of the disclosed technology, an apparatus for detecting radiation energy includes a first comparator coupled to a first voltage source, the first voltage source applying a first threshold voltage to the first comparator. The apparatus also includes a second comparator coupled to a second voltage source, the second voltage source applying a second threshold voltage to the second comparator. The apparatus further includes a radiation detector coupled to the first and second comparators, and an analog-to-digital converter (ADC) having a first input coupled to the radiation detector. The ADC is responsive to a second input to be placed in a low-power mode. The apparatus further includes control circuitry coupled to outputs of the first and second comparators and the ADC. The control circuitry is configured to determine that radiation energy is being detected by the radiation detector. The control circuitry is further configured to temporarily switch the ADC from the low-power mode to a normal operating mode so as to perform a peak measurement of the radiation energy, and determine the first threshold voltage and the second threshold voltage based on the peak measurement. The first and second threshold voltages correspond to an energy range of interest. The control circuitry is further configured to, during a window counting mode, record a number of radiation interactions detected by the radiation detector. The radiation interactions have energy that falls within the energy range of interest. The first voltage source is a digital-to-analog converter (DAC) coupled between the control circuitry and an inverting signal input of the first comparator. The second voltage source is a Digital-to-Analog circuit converter (DAC) coupled between the control circuitry and a non-inverting signal input of the second comparator. The second input of the ADC is coupled to the control circuitry.

In some examples of the disclosed technology, an apparatus for detecting radiation energy includes a comparator configuration having a first input coupled to a radiation detector and a second input coupled to a threshold voltage source. The comparator configuration includes at least one comparator. The apparatus further includes an analog-to-digital converter (ADC) having a first input coupled to the radiation detector. The ADC is configured to be responsive to a second input for placing the ADC in a low-power mode. The apparatus further includes control circuitry coupled to outputs of the comparator configuration and the ADC. The control circuitry is configured to determine that radiation energy is being received, and temporarily switch the ADC from the low-power mode to a normal operating mode. The control circuitry is further configured to perform a measurement of the radiation energy using the ADC, switch the ADC to the low-power mode, and estimate a radiation dose based on the measurement of the radiation energy.

The control circuitry is an FPGA, a digital signal processor (DSP), a microprocessor, or a microcontroller. The radiation detector includes a scintillator material. The radiation detector is configured to convert interactions between a flux of radiation emitted from a radiation source during a radiation interaction event into an electrical signal, where the electrical signal is proportional to energy absorbed in the radiation detector. The apparatus further includes an electronics conditioning suite that conditions the electrical signal and preserves the proportionality of the signal to the energy absorbed in the detector. The electronics conditioning suite includes a pre-amplifier and an analog conditioning circuit. The comparator configuration can include two or more comparators having corresponding first inputs coupled to the radiation detector, and having corresponding second inputs having a corresponding plurality of threshold voltages applied thereon.

The comparator configuration is used with specific algorithms to enable at least one of a plurality of low-power operational modes. One mode is an integral-counting mode that tallies counts of radiation interaction events with associated radiation energy that is higher than a single threshold energy value defined by one of the plurality of threshold voltages. Another mode is a window-counting mode that tallies counts of radiation interaction events with associated radiation energy that is within an energy range defined by at least two of the plurality of threshold voltages. Another mode is a multiple integral-counting mode that tallies counts of radiation interaction events with associated radiation energy that are higher than at least two threshold energy values defined by at least two of the plurality of threshold voltages. Yet another mode is a multiple window-counting mode that tallies counts of radiation interaction events with associated radiation energy that are within one or more of a plurality of energy ranges defined by at least three of the plurality of threshold voltages.

The apparatus can further include a digital-to-analog converter (DAC) coupled between the control circuitry and the second input of the comparator, where the DAC generates the threshold voltage. The threshold voltage indicates an energy threshold. The control circuitry is further configured to determine, while the ADC is in the low-power mode, that one or more of a plurality of radiation events have associated radiation energy that is higher than the energy threshold. The control circuitry can also record a count of the one or more radiation events with radiation energy higher than the energy threshold.

In some examples of the disclosed technology, a method for detecting radiation energy includes, with an analog-to-digital converter (ADC) in a sleep mode, detecting radiation energy from a radiation detector using, at least in part, a first comparator having a first input coupled to a threshold voltage level and a second input coupled to the radiation detector. In response to detecting the radiation energy, the ADC is switched to an active mode. The radiation energy is read using the ADC, and upper and lower ends of an energy range of interest are determined. The threshold voltage level on the first input of the first comparator is set using the lower end of the energy range of interest. The ADC is switched into a sleep mode, and the first comparator is used to detect the radiation energy above the lower end of the energy range of interest. A threshold voltage is set on a first input of a second comparator using the upper end of the energy range of interest. The ADC is switched into a sleep mode, and the first and second comparators are used to detect the radiation energy within the energy range of interest. Outputs from the first and second comparators can be read using a Field Programmable Gate Array (FPGA) so as to count a number of times that the radiation energy exceeds the threshold voltage levels on the first inputs to the first and second comparators. The FPGA has an integral-counting mode that records a number of comparator logic pulses generated by radiation interactions with the radiation detector. The FPGA also has a window-counting mode where the FPGA records the number of radiation interactions with the radiation detector that fall within an energy range of interest. The method of claim 18, further including entering a multiple-window counting mode where multiple energy windows are detected by the FPGA.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus for detecting radiation energy, comprising:
   a first comparator coupled to a first voltage source, the first voltage source applying a first threshold voltage to the first comparator;
   a second comparator coupled to a second voltage source, the second voltage source applying a second threshold voltage to the second comparator;
   a radiation detector coupled to the first and second comparators;
   an analog-to-digital converter (ADC) having a first input coupled to the radiation detector, the ADC being responsive to a second input to be placed in a low-power mode; and
   control circuitry coupled to outputs of the first and second comparators and the ADC, the control circuitry configured to:
      determine that radiation energy is being detected by the radiation detector;
      temporarily switch the ADC from the low-power mode to a normal operating mode so as to perform a peak measurement of the radiation energy; and
      determine the first threshold voltage and the second threshold voltage based on the peak measurement, the first and second threshold voltages corresponding to an energy range of interest.

2. The apparatus of claim 1, wherein the control circuitry is further configured to:
   during a window counting mode, record a number of radiation interactions detected by the radiation detector, the radiation interactions having energy that falls within the energy range of interest.

3. The apparatus of claim 1, wherein the first voltage source is a digital-to-analog converter (DAC) coupled between the control circuitry and an inverting signal input of the first comparator.

4. The apparatus of claim 1, wherein the second voltage source is a Digital-to-Analog Converter (DAC) coupled between the control circuitry and a non-inverting signal input of the second comparator.

5. The apparatus of claim 1, wherein the second input of the ADC is coupled to the control circuitry.

6. An apparatus for detecting radiation energy, comprising:
   a comparator configuration having a first input coupled to a radiation detector and a second input coupled to a threshold voltage source, the comparator configuration comprising at least one comparator;
   an Analog-to-Digital Converter (ADC) having a first input coupled to the radiation detector, the ADC configured to be responsive to a second input for placing the ADC in a low-power mode; and
   control circuitry coupled to outputs of the comparator configuration and the ADC, the control circuitry configured to:
      determine that radiation energy is being received;
      temporarily switch the ADC from the low-power mode to a normal operating mode;
      perform a measurement of the radiation energy using the ADC;
      switch the ADC to the low-power mode; and
      estimate a radiation dose based on the measurement of the radiation energy.

7. The apparatus of claim 6, wherein the control circuitry is an FPGA, a digital signal processor (DSP), a microprocessor, or a microcontroller.

8. The apparatus of claim 6, wherein the radiation detector includes a scintillator material.

9. The apparatus of claim 6, wherein the radiation detector is configured to:
   convert interactions between a flux of radiation emitted from a radiation source during a radiation interaction event into an electrical signal;
   wherein the electrical signal is proportional to energy absorbed in the radiation detector.

10. The apparatus of claim 9, further comprising:
    an electronics conditioning suite that conditions the electrical signal and preserves the proportionality of the signal to the energy absorbed in the detector.

11. The apparatus of claim 10, wherein the electronics conditioning suite comprises a pre-amplifier and an analog conditioning circuit.

12. The apparatus of claim 6, wherein the comparator configuration comprises two or more comparators having corresponding first inputs coupled to the radiation detector, and having corresponding second inputs having a corresponding plurality of threshold voltages applied thereon.

13. The apparatus of claim 12, wherein the comparator configuration is used with specific algorithms to enable at least one of a plurality of low-power operational modes;
   wherein one mode is an integral-counting mode that tallies counts of radiation interaction events with associated radiation energy that is higher than a single threshold energy value defined by one of the plurality of threshold voltages;
   wherein one mode is a window-counting mode that tallies counts of radiation interaction events with associated radiation energy that is within an energy range defined by at least two of the plurality of threshold voltages;

wherein one mode is a multiple integral-counting mode that tallies counts of radiation interaction events with associated radiation energy that are higher than at least two threshold energy values defined by at least two of the plurality of threshold voltages; and wherein one mode is a multiple window-counting mode that tallies counts of radiation interaction events with associated radiation energy that are within one or more of a plurality of energy ranges defined by at least three of the plurality of threshold voltages.

14. The apparatus of claim 6, further comprising a digital-to-analog converter (DAC) coupled between the control circuitry and the second input of the comparator, the DAC for generating the threshold voltage.

15. The apparatus of claim 6, wherein the threshold voltage indicates an energy threshold, and the control circuitry is further configured to:

determine, while the ADC is in the low-power mode, that one or more of a plurality of radiation events have associated radiation energy that is higher than the energy threshold; and record a count of the one or more radiation events with radiation energy higher than the energy threshold.

16. A method for detecting radiation energy, comprising:

with an Analog-to-Digital Converter (ADC) in a sleep mode, detecting radiation energy from a radiation detector using, at least in part, a first comparator having a first input coupled to a threshold voltage level and a second input coupled to the radiation detector, in response to detecting the radiation energy, switching the ADC to an active mode;

reading the radiation energy using the ADC and determining upper and lower ends of an energy range of interest;

setting the threshold voltage level on the first input of the first comparator using the lower end of the energy range of interest; and switching the ADC into a sleep mode and using the first comparator to detect the radiation energy above the lower end of the energy range of interest.

17. The method according to claim 16, further comprising:

setting a threshold voltage on a first input of a second comparator using the upper end of the energy range of interest; and switching the ADC into a sleep mode and using the first and second comparators to detect the radiation energy within the energy range of interest.

18. The method of claim 17, further including reading outputs from the first and second comparators using a Field Programmable Gate Array (FPGA) so as to count a number of times that the radiation energy exceeds the threshold voltage levels on the first inputs to the first and second comparators.

19. The method of claim 18, wherein the FPGA has an integral-counting mode that records a number of comparator logic pulses generated by radiation interactions with the radiation detector, and a window-counting mode wherein the FPGA records the number of radiation interactions with the radiation detector that fall within an energy range of interest.

20. The method of claim 18, further including entering a multiple-window counting mode wherein multiple energy windows are detected by the FPGA.

* * * * *